US010035532B2

(12) United States Patent
Gao et al.

(10) Patent No.: US 10,035,532 B2
(45) Date of Patent: Jul. 31, 2018

(54) FOLDABLE JOINT AND STROLLER

(71) Applicant: Goodbaby Child Products Co., Ltd., Kunshan, Jiangsu (CN)

(72) Inventors: Xiang Gao, Jiangsu (CN); Xiaocong Gu, Jiangsu (CN)

(73) Assignee: Goodbaby Child Products Co., Ltd. (CN)

( * ) Notice: Subject to any disclaimer, the term of this patent is extended or adjusted under 35 U.S.C. 154(b) by 0 days.

(21) Appl. No.: 15/325,922

(22) PCT Filed: Dec. 29, 2014

(86) PCT No.: PCT/CN2014/095299
§ 371 (c)(1),
(2) Date: Jan. 12, 2017

(87) PCT Pub. No.: WO2016/008268
PCT Pub. Date: Jan. 21, 2016

(65) Prior Publication Data

US 2017/0166233 A1 Jun. 15, 2017

(30) Foreign Application Priority Data

Jul. 14, 2014 (CN) .......................... 2014 1 0332287

(51) Int. Cl.
*B62B 7/10* (2006.01)
*B62B 7/06* (2006.01)
*B62B 7/08* (2006.01)

(52) U.S. Cl.
CPC .............. *B62B 7/062* (2013.01); *B62B 7/083* (2013.01); *B62B 7/10* (2013.01)

(58) Field of Classification Search
None
See application file for complete search history.

(56) References Cited

U.S. PATENT DOCUMENTS 5,669,623 A * 9/1997 Onishi ...................... B62B 7/08 16/225
6,626,451 B1 * 9/2003 Song ......................... B62B 7/08 280/642

(Continued)

FOREIGN PATENT DOCUMENTS

CN 1673003 9/2005
CN 202935408 U 5/2013

(Continued)

OTHER PUBLICATIONS

International Search Report for Application No. PCT/CN2014/095299, dated Feb. 16, 2015.

*Primary Examiner* — John D Walters
*Assistant Examiner* — Hilary Lynn Johns
(74) *Attorney, Agent, or Firm* — Knobbe, Martens, Olson & Bear, LLP

(57) ABSTRACT

Disclosed are a foldable joint having an unfolded position and a folded position, and a stroller having the foldable joint. The foldable joint comprises a base rod (1), a first rotary rod (2) and a second rotary rod (3), wherein one end portion of the base rod (1), one end portion of the first rotary rod (2) and one end portion of the second rotary rod (3) are rotationally connected to one another, a slider (4) is slidably arranged on the base rod (1), a driving part (41) is connected to the slider (4), a first guide portion (21) is arranged on the first rotary rod (2), a second guide portion (31) is arranged on the second rotary rod (3), and the driving part (41) is slidably fitted with the first guide portion (21) and the second guide portion (31) respectively. In the process of unfolding or folding the foldable joint, the driving part (41) moves relative to the first guide portion (21) and the second guide portion (31) simultaneously, and the driving part (41) moves along with the slider (4) relative to the base rod (1) such that the three components, i.e. the first rotary rod (2), the second rotary rod (3) and the base rod (1) are rotated relative to one another.

11 Claims, 4 Drawing Sheets

3
2
1
7
6

(56) References Cited

U.S. PATENT DOCUMENTS

| | | | | |
|---|---|---|---|---|
| 6,976,697 | B2 * | 12/2005 | Britton | B62K 27/003 280/47.38 |
| 7,458,599 | B2 * | 12/2008 | Kassai | B62B 7/123 280/47.38 |
| 8,496,263 | B2 * | 7/2013 | Wu | B62B 7/068 280/47.38 |
| 8,602,442 | B2 * | 12/2013 | Li | B62B 7/062 280/642 |
| D730,608 | S * | 5/2015 | Grif | D34/12 |
| 2011/0181024 | A1 * | 7/2011 | Chicca | B62B 7/062 280/642 |
| 2012/0025493 | A1 * | 2/2012 | Song | B62B 7/083 280/647 |

FOREIGN PATENT DOCUMENTS

| | | | |
|---|---|---|---|
| CN | 203544084 | U | 4/2014 |
| CN | 104129418 | A | 11/2014 |
| CN | 203996365 | U | 12/2014 |
| DE | 202013102269 | U1 | 6/2013 |
| WO | WO 2016/008268 | A1 | 1/2016 |

* cited by examiner

FOLDABLE JOINT AND STROLLER

TECHNICAL FIELD OF THE INVENTION

The present invention relates to a foldable joint capable of being folded and a stroller having such foldable joint.

BACKGROUND OF THE INVENTION

In the prior art, as disclosed in the patent published as CN1673003 and entitled Children Stroller, the stroller frame comprises a front wheel support, a rear wheel support and a push handle, the front wheel support, the rear wheel support and the push handle form a foldable joint, the rear end portion of the front wheel support and the front end portion of the rear wheel support are rotationally connected to each other by a pivot, and the front end portion of the rear wheel support is also rotationally connected to the front end portion of the push handle via another pivot. A first tooth member having a plurality of teeth is fixed to the rear end portion of the front wheel support, a second tooth member having a plurality of teeth is fixed to the front end portion of the push handle, and the first tooth member engages with the second tooth member. When the stroller frame is unfolded or folded, the second tooth member on the push handle may drive the first tooth member on the front wheel support to rotate such that the front wheel support follows the push handle to complete the unfolding or folding.

SUMMARY OF THE INVENTION

The technical problem to be solved by the present invention is to provide a foldable joint.

In order to solve the above technical problem, the technical solution employed by the present invention is: A foldable joint with an unfolded position and a folded position, comprises a base rod, a first rotary rod and a second rotary rod, two end portions of an end portion of the base rod, an end portion of the first rotary rod and an end portion of the second rotary rod are rotationally connected to each other, and the rest one is rotationally connected with at least one of the two end portions, a slider is slidably arranged on the base rod, a driving part is connected to the slider, a first guide portion is arranged on the first rotary rod, a second guide portion is arranged on the second rotary rod, and the driving part is slidably fitted with the first guide portion and the second guide portion respectively; in the process of unfolding or folding the foldable joint, the driving part moves relative to the first guide portion and the second guide portion simultaneously, and the driving part moves along with the slider relative to the base rod such that the first rotary rod, the second rotary rod and the base rod are rotated relative to one another.

In some embodiments, the first guide portion forms a first guide portion projection on the base rod, the second guide portion forms a second guide portion projection on the base rod, the slider forms a slider projection on the base rod, and when the foldable joint is at the unfolded position or the folded position, the first guide portion projection and the second guide portion projection are located at two sides of the slider projection respectively.

In some embodiments, the distance between the first guide portion and a rotation center of the first rotary rod from one end to the other end of the first guide portion gets more and more short, and the first guide portion deviates from a radial direction of a circle having a rotation center of the first rotary rod as the center; the distance between the second guide portion and a rotation center of the second rotary rod from one end to the other end of the second guide portion gets more and more short, and the second guide portion deviates from a radial direction of a circle having a rotation center of the second rotary rod as the center; when the foldable joint is at the unfolded position, the driving part is located at the one end of the first guide portion and the one end of the second guide portion respectively, and when the foldable joint is at the folded position, the driving part is located at the other end of the first guide portion and the other end of the second guide portion respectively.

In some embodiments, the slider is slidably arranged on the base rod along a linear track.

In some embodiments, the slider is slidably connected to the base rod along a radial direction of a circle having a rotation center of the base rod as the center.

In some embodiments, a sliding direction of the slider corresponds to the length direction of the base rod.

In some embodiments, the end portion of the base rod, the end portion of the first rotary rod and the end portion of the second rotary rod are pivotally connected via a first pivot.

In some embodiments, the first guide portion and the second guide portion are arc-shaped respectively.

In some embodiments, the first guide portion and the second guide portion are guide slots respectively, and the driving part is inserted into the two guide slots.

In some embodiments, the first guide portion and the second guide portion are protruding ridges respectively, and two end portions of the driving part have grooves respectively, each of the grooves is slidably fitted with corresponding one of two protruding ridges.

In some embodiments, a guide slot is opened on the slider, and the length direction of the guide slot is consistent with the sliding direction of the slider; a guide protrusion is provided on the base rod, and the guide protrusion is slidably inserted into the guide slot.

Another technical problem to be solved by the present invention is to provide a stroller.

In order to solve the above technical problem, the technical solution employed by the present invention is: a stroller comprises a foldable joint according to any one of the above embodiments, and the stroller further comprises a front wheel assembly provided at another end portion of the first rotary rod and a rear wheel assembly provided at another end portion of the base rod, and a push handle is provided at another end portion of the second rotary rod.

The scope of the present invention is not limited to technical solutions specifically combined by the above technical features, and should encompass other technical solutions formed by any combination of the above technical features or the equivalent features thereof. For example, the technical solutions are formed by substituting between the above technical features and, but not limited to, the technical features with similar functions disclosed by the present invention.

Due to the use of the above technical solutions, the present invention has the following advantages over the prior art: the second rotary rod is rotationally folded relative to the base rod, the slider is driven to slide by the second guide portion via the driving part, and meanwhile the driving part slides relative to the first guide portion such that the first rotary rod is rotationally folded relative to the base rod, i.e., the first rotary rod, the base rod and the second rotary rod rotationally get close to one another.

Figure 1:
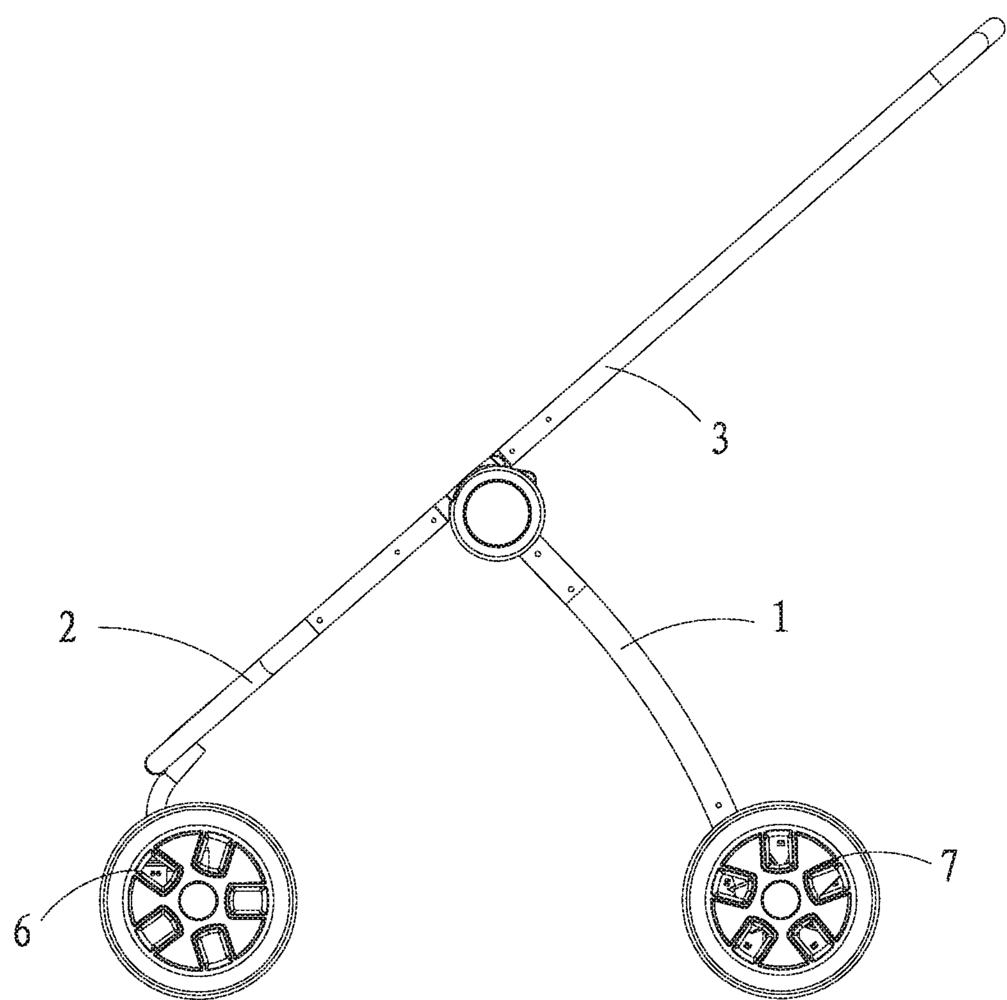
FIG. 1 is a main view of a stroller frame (the stroller frame is at the unfolded position)

Wherein, 1—base rod; 11—fixing pin; 2—first rotary rod; 21—first guide portion; 3—second rotary rod; 31—second guide portion; 4—slider; 41—driving part; 5—first pivot; 6—front wheel assembly; 7—rear wheel assembly; 8—push handle.

DETAILED DESCRIPTION OF EMBODIMENTS

As shown in the figures, a foldable joint with an unfolded position and a folded position, comprises a base rod 1, a first rotary rod 2 and a second rotary rod 3, and the foldable joint further comprises a locking mechanism for locking the base rod 1, the first rotary rod 2 and the second rotary rod 3 to one another. The locking mechanism is not the key point of the present invention, and any mechanism capable of locking two or three rotary components to one another is suitable.

Two end portions of an end portion of the base rod 1, an end portion of the first rotary rod 2 and an end portion of the second rotary rod 3 are rotationally connected to each other, and the rest one is rotationally connected with at least one of the two end portions, i.e., these three end portions may be rotationally connected via a pivot, and also may be rotationally connected via two pivots. In this embodiment, the end portion of the base rod 1, the end portion of the first rotary rod 2 and the end portion of the second rotary rod 3 are pivotally connected via a first pivot 5. A rotation center mentioned hereinafter is the axis of the first pivot 5.

A slider 4 is slidably arranged on the base rod 1, a driving part 41 is connected to the slider 4, a first guide portion 21 is arranged on the first rotary rod 2, a second guide portion 31 is arranged on the second rotary rod 3, and the driving part 41 is slidably fitted with the first guide portion 21 and the second guide portion 31 respectively; in the process of unfolding or folding the foldable joint, the driving part 41 moves relative to the first guide portion 21 and the second guide portion 31 simultaneously, and the driving part 41 moves along with the slider 4 relative to the base rod 1 such that the three components, i.e. the first rotary rod 2, the second rotary rod 3 and the base rod 1 are rotated relative to one another.

Figure 3:
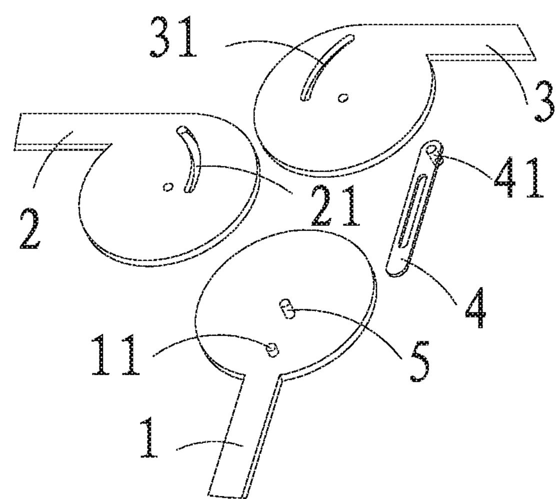
FIG. 3 is an exploded view of a foldable joint (Embodiment 1)
Figure 4:
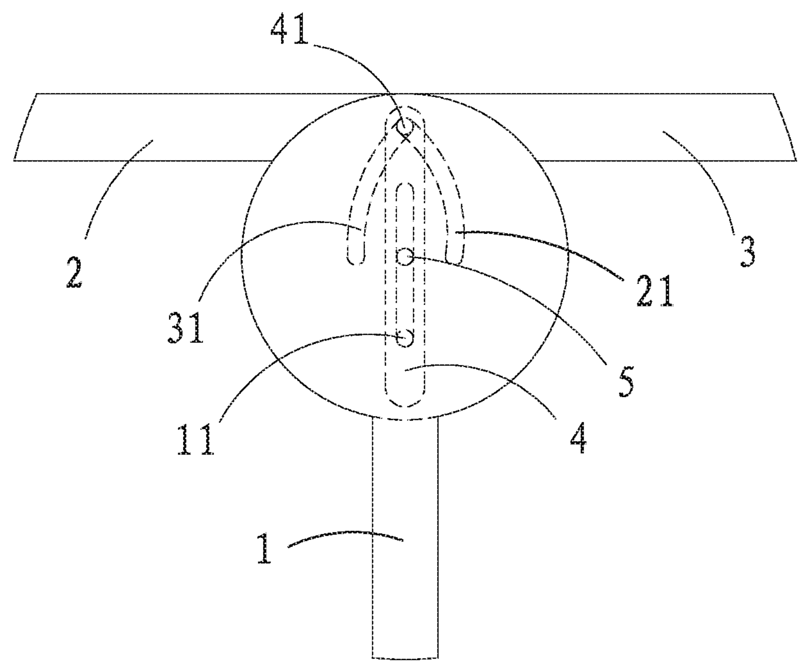
FIG. 4 is a schematic state diagram of the foldable joint (Embodiment 1, the foldable joint is at the unfolded position)
Figure 5:
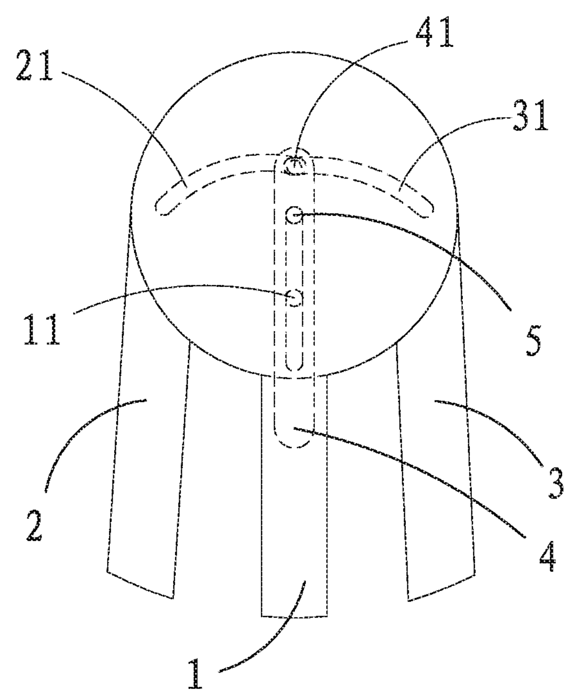
FIG. 5 is a schematic state diagram of the foldable joint (Embodiment 1, the foldable joint is at the folded position)
Figure 6:
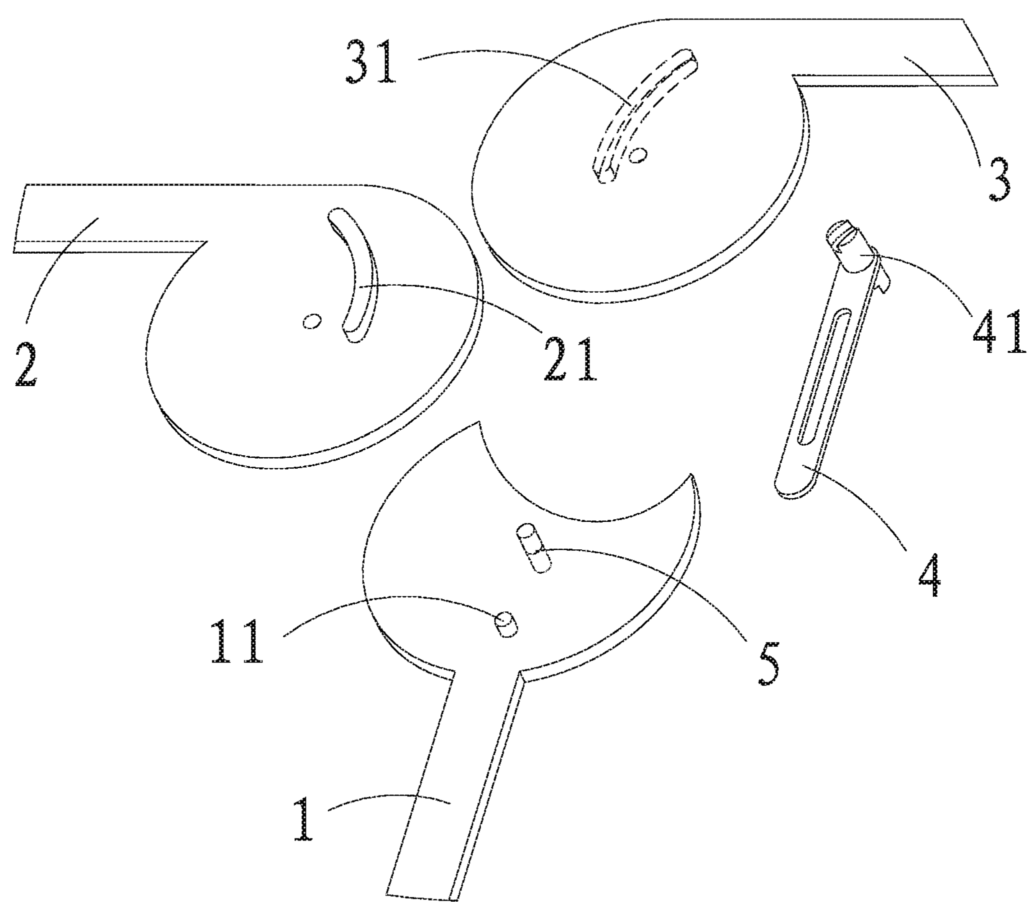
FIG. 6 is an exploded view of a foldable joint (Embodiment 2)

Wherein, the driving part 41 being slidably fitted with the first guide portion 21 and the second guide portion 31 respectively, may be Embodiment 1 as shown in FIGS. 3-5, that is, both the first rotary rod 2 and the second rotary rod 3 are located at the same side of the base rod 1, the first guide portion 21 and the second guide portion 32 are guide slots respectively, and the driving part 41 is inserted into the two guide slots. Also, it may be Embodiment 2 as shown in FIG. 6, that is, the first rotary rod 2 and the second rotary rod 3 are located at two sides of the base rod 1 respectively, the first guide portion 21 and the second guide portion 31 are protruding ridges respectively, and two end portions of the driving part 41 have grooves respectively each of which is slidably fitted with corresponding one of two protruding ridges.

Referring to FIG. 4 and FIG. 5, the first guide portion 21 forms a first guide portion projection on the base rod 1, the second guide portion 31 forms a second guide portion projection on the base rod 1, the slider 4 forms a slider projection on the base rod 1, and when the foldable joint is at the unfolded position or the folded position, the first guide portion projection and the second guide portion projection are located at two sides of the slider projection respectively.

The distance between the first guide portion 21 and a rotation center of the first rotary rod 2 from one end to the other end of the first guide portion 21 gets more and more short, and the first guide portion 21 deviates from a radial direction of a circle having a rotation center of the first rotary rod 2 as the center; the distance between the second guide portion 31 and a rotation center of the second rotary rod 3 from one end to the other end of the second guide portion 31 gets more and more short, and the second guide portion 31 deviates from a radial direction of a circle having a rotation center of the second rotary rod 3 as the center; when the foldable joint is at the unfolded position, the driving part 41 is located at the one end of the first guide portion 21 and the one end of the second guide portion 31 respectively, and when the foldable joint is at the folded position, the driving part 41 is located at the other end of the first guide portion 21 and the other end of the second guide portion 31 respectively.

The slider 4 is slidably arranged on the base rod 1 along a linear track. A guide slot is opened on the slider 4, and the length direction of the guide slot is consistent with the sliding direction of the slider 4. A guide protrusion is provided on the base rod 1, and the guide protrusion is inserted into the guide slot. In the this embodiment, the guide protrusion consists of the first pivot 5 and a fixing pin 11 which together limit the slider 4 to slide along a linear direction. Vice versa, i.e., a guide slot is opened on the base rod 1, and a guide protrusion is provided on the slider 4. In this embodiment, the slider 4 is slidably connected to the base rod 1 along a radial direction of a circle having a rotation center of the base rod 1 as the center.

The sliding direction of the slider 4 corresponds to the length direction of the base rod 1.

The first guide portion 21 and the second guide portion 31 are arc-shaped respectively.

The sliding direction of the slider 4, the length direction of the first guide portion 21 and the length direction of the second guide portion 31 intersect to one another.

Operating instructions: as shown in FIG. 4 and FIG. 5, during the conversion from the unfolded position to the folded position of the foldable joint, the second rotary rod 3 rotationally gets close to the base rod 1, the driving part 41 moves from the one end to the other end of the second guide portion 31, and the slider 4 slides downwardly such that the driving part 41 also from the one end to the other end of the first guide portion 21, and such that the first rotary rod 2 and the second rotary rod 3 rotationally get close to the base rod 1 synchronously; during the conversion from the folded position to the unfolded position of the foldable joint, the second rotary rod 3 rotationally gets away from the base rod 1, the driving part 41 moves from the other end to the one end of the second guide portion 31, and the slider 4 slides upwardly such that the driving part 41 also from the other end to the one end of the first guide portion 21, and such that the first rotary rod 2 and the second rotary rod 3 rotationally get away from the base rod 1 synchronously.

Figure 2:
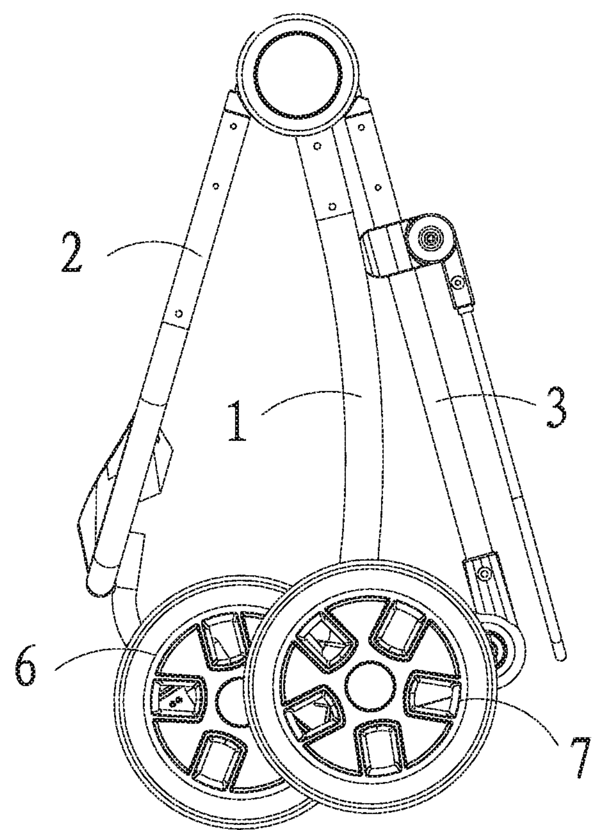
FIG. 2 is a main view of the stroller frame (the stroller frame is at the folded position)

The above-mentioned foldable joint is applied to a stroller, as shown in FIG. 1 and FIG. 2, a front wheel support formed by the first rotary rod 2 is provided with a front wheel assembly, a rear wheel support formed by the base rod 1 is provided with a rear wheel assembly, and the second rotary rod 3 forms a push handle.

The above-mentioned foldable joint also may be applied to a child dining chair, such as the first rotary rod 2 forms a front support for supporting a seat mechanism, the base rod 1 forms a rear support for supporting the seat mechanism, and the second rotary rod 3 forms a backrest rod of the seat mechanism.

As above described, the present invention is explained according to the purpose thereof, but the present invention is not limited to the above-mentioned embodiments and implement methods. Various variations and implementations can be made by the practitioners of the relative technical fields within the technical concept of the present invention.

What is claimed is:

1. A foldable joint with an unfolded position and a folded position, comprising a base rod, a first rotary rod and a second rotary rod, two end portions of an end portion of the base rod, an end portion of the first rotary rod and an end portion of the second rotary rod are rotationally connected to each other, and the rest one is rotationally connected with at least one of the two end portions, a slider is slidably arranged on the base rod, wherein a driving part is connected to the slider, a first guide portion is arranged on the first rotary rod, a second guide portion is arranged on the second rotary rod, and the driving part is slidably fitted with the first guide portion and the second guide portion respectively; in the process of unfolding or folding the foldable joint, the driving part moves relative to the first guide portion and the second guide portion simultaneously, and the driving part moves along with the slider relative to the base rod such that the first rotary rod, the second rotary rod and the base rod are rotated relative to one another;

wherein the first guide portion forms a first guide portion projection on the base rod, the second guide portion forms a second guide portion projection on the base rod, the slider forms a slider projection on the base rod, and when the foldable joint is at the unfolded position or the folded position, the first guide portion projection and the second guide portion projection are located at two sides of the slider projection respectively.

2. The foldable joint according to claim 1, wherein the distance between the first guide portion and a rotation center of the first rotary rod from one end to the other end of the first guide portion gets more and more short, and the first guide portion deviates from a radial direction of a circle having a rotation center of the first rotary rod as the center; the distance between the second guide portion and a rotation center of the second rotary rod from one end to the other end of the second guide portion gets more and more short, and the second guide portion deviates from a radial direction of a circle having a rotation center of the second rotary rod as the center; when the foldable joint is at the unfolded position, the driving part is located at the one end of the first guide portion and the one end of the second guide portion respectively, and when the foldable joint is at the folded position, the driving part is located at the other end of the first guide portion and the other end of the second guide portion respectively.

3. The foldable joint according to claim 1, wherein the slider is slidably arranged on the base rod along a linear track.

4. The foldable joint according to claim 1, wherein the slider is slidably connected to the base rod along a radial direction of a circle having a rotation center of the base rod as the center.

5. The foldable joint according to claim 1, wherein a sliding direction of the slider corresponds to the length direction of the base rod.

6. The foldable joint according to claim 1, wherein the end portion of the base rod, the end portion of the first rotary rod and the end portion of the second rotary rod are pivotally connected via a first pivot.

7. The foldable joint according to claim 1, wherein the first guide portion and the second guide portion are arc-shaped respectively.

8. The foldable joint according to claim 1, wherein the first guide portion and the second guide portion are guide slots respectively, and the driving part is inserted into the two guide slots.

9. The foldable joint according to claim 1, wherein the first guide portion and the second guide portion are protruding ridges respectively, and two end portions of the driving part have grooves respectively, each of the grooves is slidably fitted with corresponding one of two protruding ridges.

10. The foldable joint according to claim 1, wherein a guide slot is opened on the slider, and the length direction of the guide slot is consistent with the sliding direction of the slider; a guide protrusion is provided on the base rod, and the guide protrusion is slidably inserted into the guide slot.

11. A stroller comprising the foldable joint according to claim 1, wherein the stroller further comprises a front wheel assembly provided at another end portion of the first rotary rod and a rear wheel assembly provided at another end portion of the base rod, and a push handle is provided at another end portion of the second rotary rod.

* * * * *